J. B. HAWKS.
BRACKET FOR LUMBER ROLLERS.
APPLICATION FILED APR. 27, 1920.
1,428,328. Patented Sept. 5, 1922.
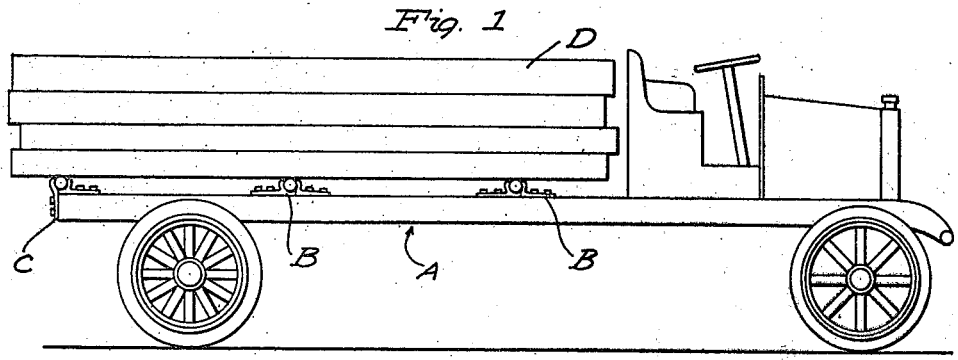
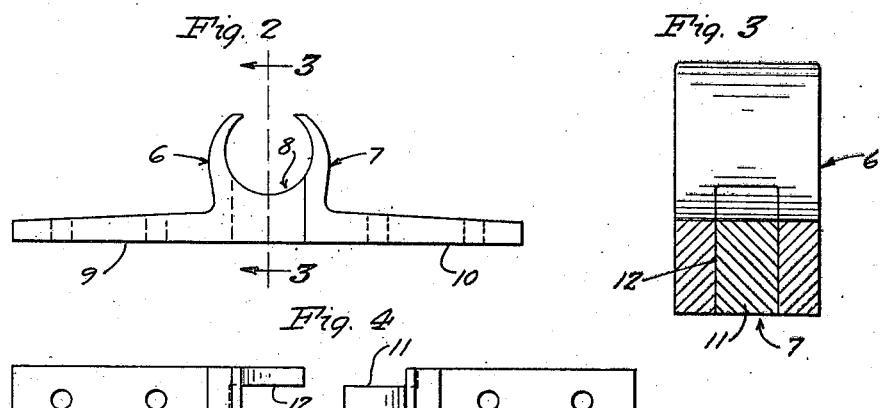
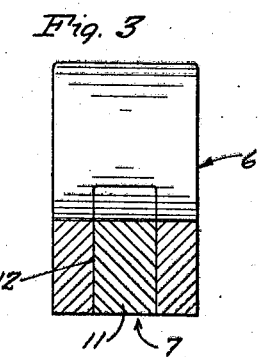
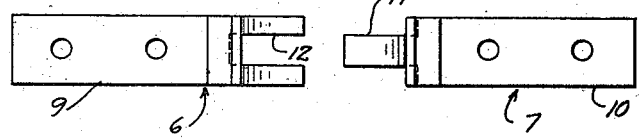
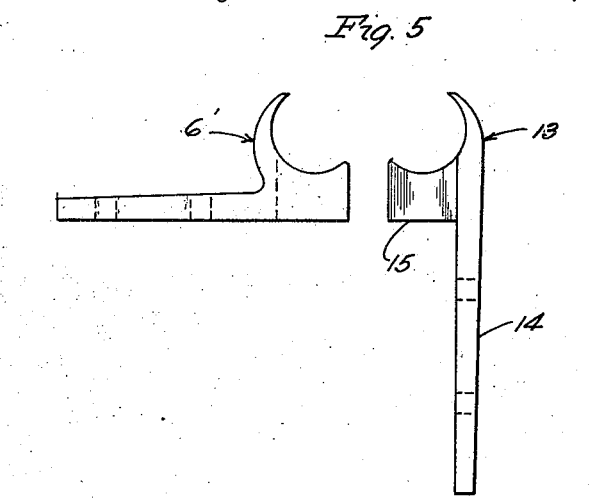
Inventor
Joseph B. Hawks
by Westall and Wallace
his Attorneys Patented Sept. 5, 1922.

1,428,328

UNITED STATES PATENT OFFICE.

JOSEPH B. HAWKS, OF LOS ANGELES, CALIFORNIA.

BRACKET FOR LUMBER ROLLERS.

Application filed April 27, 1920. Serial No. 377,009.

*To all whom it may concern:*

Be it known that I, JOSEPH B. HAWKS, a citizen of the United States, residing at Los Angeles, in the county of Los Angeles and State of California, have invented new and useful Improvements in a Bracket for Lumber Rollers, of which the following is a specification.

This invention relates to the mounting of rollers for supporting articles such as lumber so that a bed is provided upon which the articles may rest and be moved with little effort.

The invention as disclosed herein is embodied in a mounting for rollers upon vehicles adapted to the transportation of lumber. It is the usual practice in such vehicles to provide rollers extending transverse of the vehicle body with bearing brackets at the sides in which the rollers are journalled. The tops of the brackets are cut away exposing the rollers, and to maintain the rollers in position the brackets must be formed to partially embrace the rollers. This may be done by placing the rollers in position and then bending the brackets over the rollers. Such a method requires heating of the brackets. Another method is to split the brackets vertically and depend upon bolting the sections to hold them together. Splitting the brackets makes the rollers and brackets easier to assemble. The weight of the load on a roller tends to separate the sections of a split bracket, placing a strain upon the bolts. The bracket also wears at the line of division, and the tendency to move the sections from each other is increased thereby.

It is an object of this invention to provide a split bracket of the character described, in which there is no tendency to separate the sections, and in which pressure upon the roller tends to draw the sections together.

These objects and other objects are attained by means of the embodiment of my invention illustrated in the accompanying drawing, in which:

Fig. 1 is a side elevation of a truck equipped with brackets and rollers; Fig. 2 is an enlarged side elevation of a bracket; Fig. 3 is an enlarged section taken on the line 3—3 of Fig. 2; Fig. 4 is a plan view of a bracket with the sections separated; and Fig. 5 is a side elevation of an end bracket.

Referring more particularly to Fig. 1, the bed of the automobile body is indicated by A. Mounted intermediate the front and rear of the bed are brackets indicated by B. At the ends of the bed is a bracket indicated by C. Journalled in the bracket transverse to the bed are rollers and supported upon the rollers is a load of lumber D. The brackets indicated by B are illustrated in detail in Figs. 2, 3, and 4. The end bracket indicated by C is illustrated in Fig. 5.

Referring to Figs. 2, 3, and 4, it will be noted that the bracket consists of two sections 6 and 7. The sections when assembled form a bracket having a bearing portion indicated by 8 and feet indicated by 9 and 10. The bearing portion 8 is in the form of two horns embracing the roller, but leaving the top free. Section 7 has a tenon 11 which extends into a mortise 12 in section 6. The division of the bracket is such that a portion of section 7 extends beyond the median vertical plane, and a portion of section 6 extends beyond said plane. Thus, the roller when placed therein will rest completely in either section, and there is substantially no components of force tending to separate the sections. The brackets may be suitably fastened to the bed by bolts, or any other convenient means. The end brackets has a section 6' like the bracket just described, but the cooperating section has a foot 13 extending vertically. In Fig. 5 the section is indicated by 12 and its base by 13. The tenon is indicated by 14. It will be noted that as there is little and substantially no tendency to separate the sections, that the bolts securing the section 12 to the bed do not have to be large enough to stand any substantial strain.

What I claim is:

1. A split bracket bearing comprising sections having feet for securing the sections in position and hook like extensions overlapping along a line extending on either side of the axial vertical median plane so that the weight of the shaft will hold the sections in position.

2. A split bracket bearing comprising sections having feet for securing the sections in position, one section having a hook like tenon fitting into a hook like mortise on the other section, the tenon and mortise extending on both sides of the axial vertical median plane so that the weight of the shaft will hold the sections in position.

In witness that I claim the foregoing I have hereunto subscribed my name this 27th day of March, 1920.

JOSEPH B. HAWKS.